(12) United States Patent
Duriez et al.

(10) Patent No.: US 10,889,209 B2
(45) Date of Patent: Jan. 12, 2021

(54) ADJUSTMENT MECHANISM FOR MOTOR VEHICLE SEAT

(71) Applicant: Faurecia Sièges d'Automobile, Nanterre (FR)

(72) Inventors: Didier Duriez, Le Plessis-Pate (FR); Medhi Biyjeddiguen, Flers (FR); Fabrice Petit, Saint Georges des Groseillers (FR)

(73) Assignee: FAURECIA SIÈGES D'AUTOMOBILE, Nanterre (FR)

(*) Notice: Subject to any disclaimer, the term of this patent is extended or adjusted under 35 U.S.C. 154(b) by 154 days.

(21) Appl. No.: 16/131,901

(22) Filed: Sep. 14, 2018

(65) Prior Publication Data

US 2019/0077280 A1 Mar. 14, 2019

(30) Foreign Application Priority Data

Sep. 14, 2017 (FR) .................................... 17 58546

(51) Int. Cl.
*B60N 2/08* (2006.01)
*B60N 2/07* (2006.01)
*B60N 2/06* (2006.01)
*B60N 2/02* (2006.01)

(52) U.S. Cl.
CPC .............. *B60N 2/0881* (2013.01); *B60N 2/06* (2013.01); *B60N 2/07* (2013.01); *B60N 2/0875* (2013.01); *B60N 2002/0272* (2013.01)

(58) Field of Classification Search
CPC .................. B60N 2/06–146; B60N 2002/0272
See application file for complete search history.

(56) References Cited

U.S. PATENT DOCUMENTS

| 4,949,931 A | * | 8/1990 | Fujiwara | ............... B60N 2/0292 248/429 |
| 5,373,740 A | * | 12/1994 | Yoshida | ................ G01P 15/105 324/162 |
| 5,955,882 A | * | 9/1999 | Eisschiel | ................ G01D 5/142 324/207.21 |
| 6,051,971 A | * | 4/2000 | Holden | .................. G01D 5/145 324/202 |

(Continued)

FOREIGN PATENT DOCUMENTS

| EP | 1759164 B1 | 3/2007 |
| JP | 2004012305 A | * 1/2004 |

OTHER PUBLICATIONS

French Search Report on French application No. FR 1758546, dated May 22, 2018, 2 pages.

*Primary Examiner* — Patrick Assouad
*Assistant Examiner* — Demetrius R Pretlow
(74) *Attorney, Agent, or Firm* — Reising Ethington P.C.

(57) ABSTRACT

An adjustment mechanism for a motor vehicle seat includes first and second sensors, which are mounted on a first component of the adjustment mechanism, and protuberances provided on the second component of the adjustment mechanism. The first and second sensors are mounted facing the protuberances, with the sensors being positioned so that there is a phase difference between the signals detected by the two sensors. The mechanism includes an electronic control unit that determines a direction of movement of the components, based on the detected phase difference.

29 Claims, 7 Drawing Sheets

(56) References Cited

U.S. PATENT DOCUMENTS

| | | | | |
|---|---|---|---|---|
| 6,935,692 | B2* | 8/2005 | Nishide | B60N 2/002 248/429 |
| 7,301,348 | B2* | 11/2007 | Kaneko | G01D 5/2412 324/207.17 |
| 7,535,215 | B2* | 5/2009 | Forster | G01D 5/145 324/165 |
| 7,969,144 | B2* | 6/2011 | Jajtic | H02K 11/215 324/207.2 |
| 8,063,628 | B2* | 11/2011 | Finkler | G01D 5/2046 324/207.24 |
| 8,680,847 | B2* | 3/2014 | Franke | G01D 5/145 324/174 |
| 2002/0017902 | A1* | 2/2002 | Vasiloiu | G01D 5/2046 324/207.17 |
| 2003/0122541 | A1* | 7/2003 | Lantto | G01D 5/20 324/207.16 |
| 2004/0021457 | A1 | 2/2004 | Johnson | |
| 2007/0069100 | A1 | 3/2007 | Schuler et al. | |
| 2009/0102224 | A1* | 4/2009 | Rohee | B60N 2/682 296/65.14 |
| 2010/0219813 | A1* | 9/2010 | Ito | G01D 5/145 324/207.22 |
| 2011/0109252 | A1* | 5/2011 | Takagi | H02K 41/03 318/135 |
| 2012/0126797 | A1* | 5/2012 | Kawano | G01D 5/147 324/207.21 |
| 2012/0133357 | A1* | 5/2012 | Fritz | G01D 5/145 324/207.24 |
| 2012/0293167 | A1* | 11/2012 | Kitanaka | G01D 5/147 324/207.25 |
| 2013/0087674 | A1* | 4/2013 | Couasnon | B60N 2/0232 248/429 |
| 2013/0184942 | A1* | 7/2013 | Cuddihy | G01D 5/2457 701/49 |

* cited by examiner

ADJUSTMENT MECHANISM FOR MOTOR VEHICLE SEAT

TECHNICAL FIELD

The present invention relates to a device for detecting the relative displacement of two components of a mechanism for adjusting a motor vehicle seat, in relation to one another.

BACKGROUND

Such an adjustment mechanism for motor vehicle seat comprises for example a rail. Document EP 1,759,164 is known, which describes a device for a rail for vehicle seat which enables detecting the relative displacement of the two sections in relation to one another.

However, in the case of the device described, the detected signal will be only representative of a relative movement of the sections in relation to one another.

SUMMARY

The present invention is intended to overcome these disadvantages by providing a device which allows better determination and control of the movement of the rail sections in relation to one another during their relative movements.

For this purpose, the invention relates to an adjustment mechanism for motor vehicle seat, comprising a first component able to move relative to a second component along a first degree of freedom, and comprising:
  at least a first and a second sensor which are mounted on the first component,
  at least one plurality of protuberances provided on the second component, said protuberances being spaced apart from one another along the first degree of freedom,
  said first sensor being mounted facing at least one plurality of protuberances so as to be able to detect the presence or absence of a protuberance facing said first sensor during a relative movement of the first and second components along the first degree of freedom,
  said second sensor being mounted facing at least one plurality of protuberances so as to be able to detect the presence or absence of a protuberance facing the second sensor during a relative movement of the first and second components along the first degree of freedom,
  the sensors being positioned so that there is a phase difference between the signals detected by the two sensors,
  the adjustment mechanism further comprising an electronic control unit able to determine a direction of movement of the components in relation to one another, based on said detected phase difference.

With these arrangements, the electronic control unit advantageously also allows determining the direction of movement of one section in relation to the other.

In preferred embodiments of the device according to the invention, one or more of the following arrangements may possibly also be used:
  said first and second sensors are facing the same plurality of protuberances,
    an inter-sensor distance, corresponding to a distance between said first and second sensors along the longitudinal direction, being different both from a length of a pattern or patterns, and from an integer multiple of said length of the pattern or patterns,
    the length of said pattern or of each of said patterns corresponding to a sum of a length of a protuberance and a length of a space between said protuberance and an adjacent protuberance of said plurality of protuberances along the first degree of freedom (such an embodiment enabling the detection of different signals according to the direction of movement, with a single plurality of protuberances);
  said protuberances are regularly spaced apart from one another along the second component (such an embodiment corresponds to the case where the protuberances, e.g. teeth, are regularly spaced apart);
  said first and second sensors are each respectively facing a plurality of protuberances,
    an inter-sensor distance, corresponding to a distance between said first and second sensors, is different both from an offset between the patterns of the plurality of protuberances, and from a sum of said offset and an integer multiple of said length of a pattern or patterns,
    the offset corresponding to a difference between a position of a given protuberance of one of the pluralities of protuberances and the position of a protuberance of the other plurality of protuberances, located opposite said given protuberance,
    the length of said pattern or of each of said patterns corresponding to a sum of a length of a protuberance and a length of a space between said protuberance and an adjacent protuberance of said plurality of protuberances along the first degree of freedom (this enables detection of different signals according to the direction of movement, with two pluralities of protuberances);
  said first and second sensors are respectively facing a plurality of protuberances regularly spaced apart from one another, with a same spacing between said two pluralities of protuberances,
    an inter-sensor distance, corresponding to a distance between said two sensors, is zero,
    and said two pluralities of protuberances have a non-zero offset between them which is different from the length of a pattern,
    the offset corresponding to a difference between a position of a given protuberance of one of the pluralities of protuberances and the position of a protuberance of the other plurality of protuberances, located opposite said given protuberance,
    the length of a pattern corresponding to the sum of the length of a protuberance and the length of the space between said protuberance and an adjacent protuberance of said plurality of protuberances (case of two sensors facing in opposite directions);
  said protuberances are teeth, of which at least some are used to lock the relative position of movement between said components;
  the adjustment mechanism for a motor vehicle seat comprises a rail:
    a first section on which said first and second sensors are mounted is the upper section of the rail,
    a second section, comprising said one or more pluralities of teeth, is the lower section of the rail,
    the first degree of freedom is a longitudinal direction of respective sliding of the first and second sections;
  the first and second sensors are mounted along a lateral flange of the upper section, the plurality of teeth is arranged along a lateral flange of the lower section, the lateral flange of the upper section being placed facing the lateral flange of the lower section, so that the plurality of teeth is placed facing the first and second sensors;

the two sensors are mounted on two opposite lateral flanges of the upper section, each plurality of teeth is arranged on an opposite lateral flange of the lower section, each lateral flange of the upper section being placed facing a lateral flange of the lower section, so that each plurality of teeth of the lower section is facing a sensor of the upper section;

the upper section comprises one or more openings in one and/or the other of its lateral flanges, said sensors are mounted integral with a housing, said housing being mounted on said upper section such that each sensor is facing one of said openings (this embodiment providing compactness and practicality);

the housing is fixed to a horizontal upper web of the upper section (this implementation providing compactness);

the housing is held on the horizontal upper web of the upper section by tabs formed on the surface of the housing which clip into openings formed in said web (this embodiment facilitating assembly);

each sensor is formed by a Hall effect sensor able to detect the presence or absence of teeth facing said sensor (advantages: reliability of this type of sensor/small footprint).

According to another aspect, the invention relates to a vehicle seat comprising such an adjustment mechanism for motor vehicle seat.

BRIEF DESCRIPTION OF THE DRAWINGS

Other features and advantages of the invention will be apparent from the following description of several of its embodiments, given as non-limiting examples, with reference to the accompanying drawings.

In the drawings.

In the various figures, the same references designate identical or similar elements.

DETAILED DESCRIPTION

Figure 1:
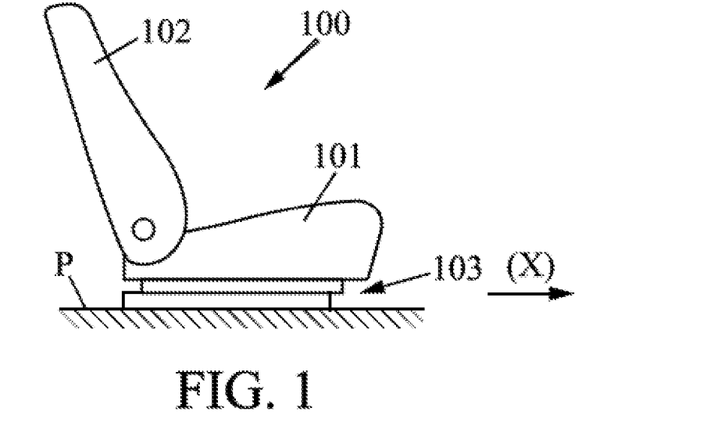
FIG. 1 is a diagram representing a motor vehicle seat.

FIG. 1 schematically and partially represents a vehicle seat 100 comprising a seating portion 101 with a seat frame, and a backrest 102 mounted on the seating portion 101, this assembly being mounted so as to slide relative to the floor P of the vehicle by means of a longitudinal rail system 103. The front of the vehicle seat 100 is located on the right in FIG. 1, and the rear is on the left in FIG. 1. The longitudinal direction X is the front-rear direction, independently of the orientation of the seat itself within the vehicle. Other architectures of motor vehicle seats are conceivable.

Figure 2:
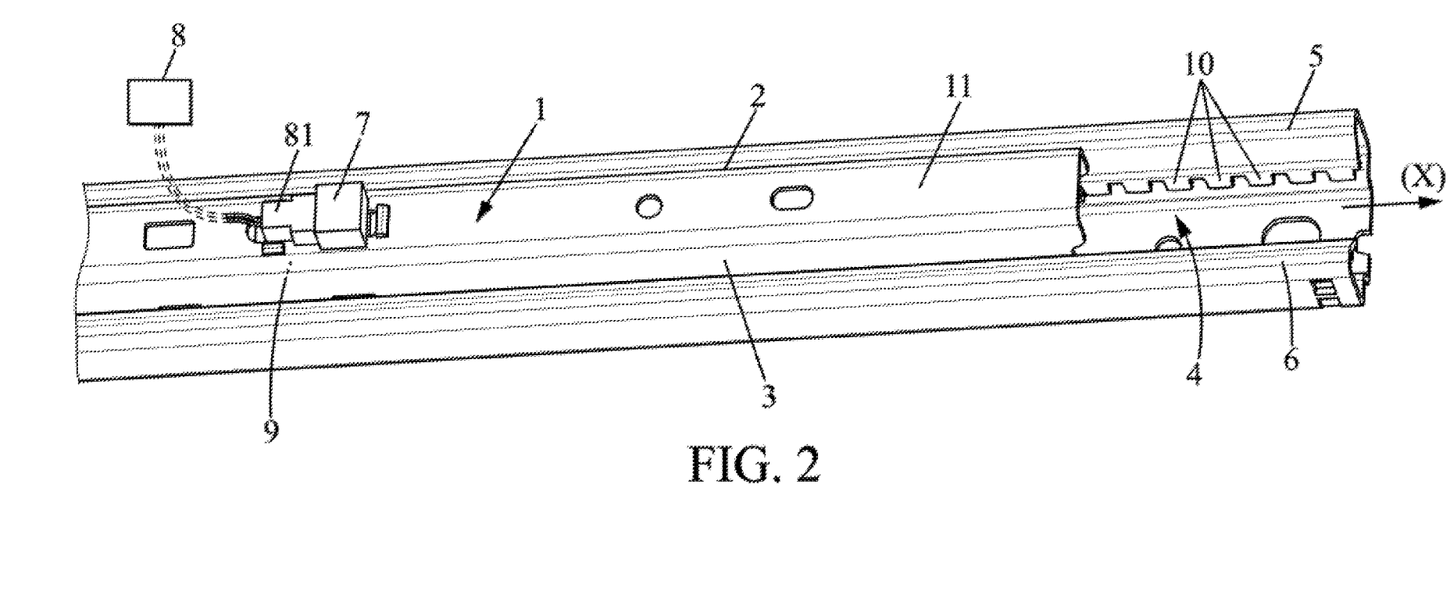
FIG. 2 is a partial perspective view of a rail of a motor vehicle seat.

In such a rail system, two parallel rails are generally used. One of these rails will be described below, as shown in FIG. 2; the other rail may be identical or similar. A first upper section 1 is adapted to slide within a second lower section 4, along a longitudinal direction X. The second lower section 4 is intended to be fixed to the floor P. The first upper section 1 is intended to be fixed to the seating portion 101. The words "lower" and "upper" are used with reference to the vertical. However, in other examples not shown, the sections of the rail are not necessarily a lower section and an upper section.

The system comprises two sensors 9 mounted on the upper section 1.

The lower section 4 also comprises a plurality of protuberances 10 spaced apart from each other along the longitudinal direction.

When the sections are mounted one inside the other in order to slide, the protuberances 10 are thus placed facing the sensors 9.

Each sensor 9 is adapted to detect the presence or absence of a facing protuberance 10. When the sections move relative to one another, each sensor 9 detects the passage of the protuberances which face it.

The sensors 9 are positioned relative to each other along the longitudinal direction, and relative to the position and spacing between the protuberances 10, so that there is a phase difference between the signals detected by the two sensors 9. The system also comprises an electronic control unit 8 which makes it possible to determine, from the phase difference detected between the signals of the two sensors 9, the direction in which the sections are moving relative to one another.

More particularly, the upper section 1 is fixed to the seating portion and slides along the longitudinal direction within the lower section 4 which is fixed to the floor. As shown in FIG. 2, according to one embodiment, the upper section 1 has a substantially U-shaped cross-section with two lateral flanges 2, 3 extending substantially vertically downwards from a horizontal upper web 11. The lower section 4 also has a U-shaped cross-section with two lateral flanges 5, 6 which extend facing the lateral flanges 2, 3 of the upper section 1.

The inter-sensor distance will be defined as being the distance between the first and second sensors 9 along the longitudinal direction.

The length of a pattern will be defined as the sum of a length along the longitudinal direction of a protuberance 10 and a length along the longitudinal direction of a space between said protuberance and an adjacent protuberance along the longitudinal direction.

The following description illustrates three possible embodiments of the rail system of the invention, particularly the case where the protuberances are regularly spaced apart, but does not exclude other possible embodiments of the invention, particularly the case where the protuberances are not regularly spaced apart.

Figure 3:
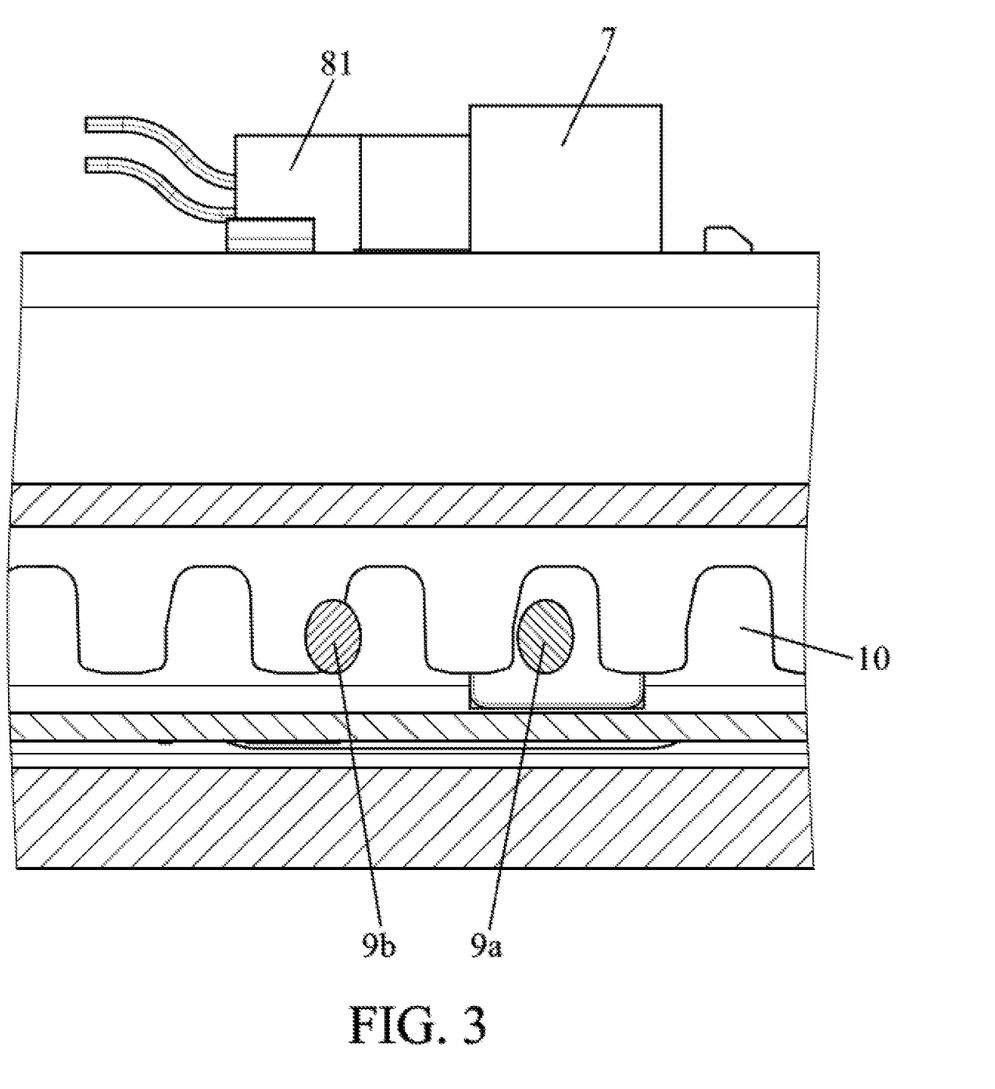
FIG. 3 is a sectional side view of the rail of FIG. 2.

In a first embodiment illustrated in FIG. 3, the system comprises a front sensor 9a, placed more forward along the direction of movement of the vehicle relative to a rear sensor 9b, the front 9a and rear 9b sensors being mounted at two longitudinally different positions along one of the lateral flanges 2 of the section.

The lower section 4 comprises a plurality of protuberances 10, which are typically teeth, extending along one of its lateral flanges 5, facing the lateral flange 2 of the upper section 1 comprising the two sensors 9. The protuberances 10 are regularly spaced apart along the longitudinal direction. The protuberances are for example formed by cutouts in the lateral flange of the lower section 4. The protuberances are for example used for locking the relative sliding position between said sections, by mechanical interaction with a latch (not shown) mounted on the upper section 4. The latch comprises in particular a locking member mounted so as to move relative to the upper section between a first position and a second position, and biased by a biasing element to its first position, where it engages with a protuberance of the lower section so as to prevent relative movement between the two sections along the longitudinal direction. Under the action of a user, the locking member can be moved to its second position by user action against the action of the biasing element, where it no longer engages with the lower section and it allows such relative movement between the two sections along the longitudinal direction.

The protuberances 10 will for example typically be used to lock the rail sections relative to one another.

In this embodiment, the inter-sensor distance is different both from the length of a pattern and from an integer multiple of the length of a pattern.

Figure 4A:
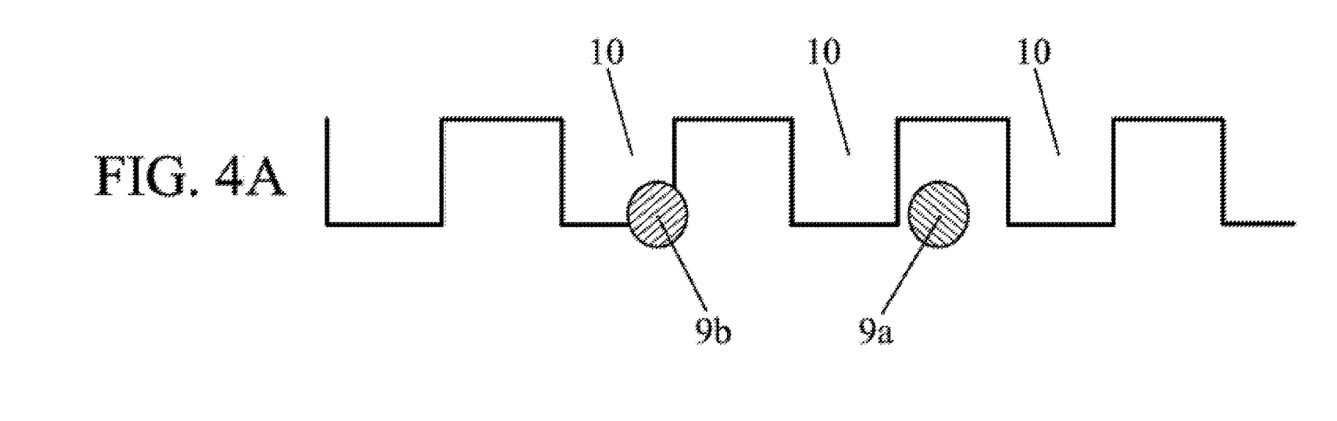
FIG. 4A is a schematic side view of a rail section.
Figure 4B:
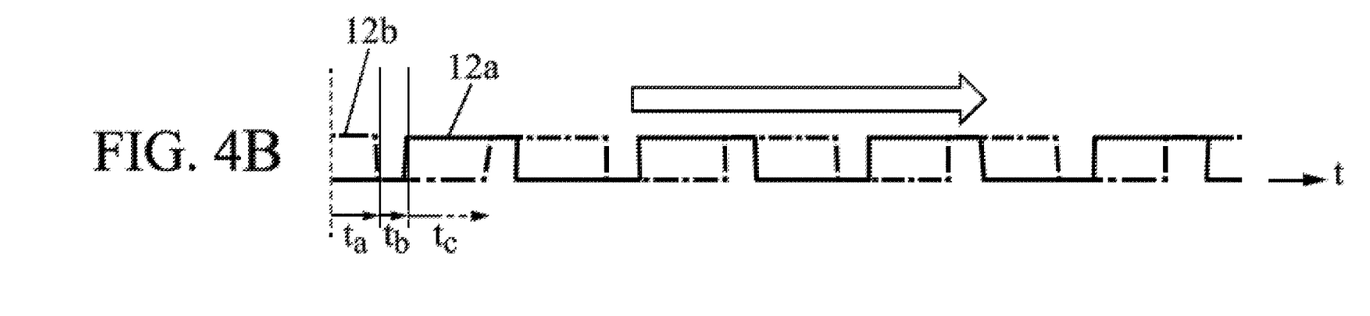
FIGS. 4B and 4C show two diagrams of the signals measured by the two sensors over time, according to the direction of movement of the sliding rail section.
Figure 4C:
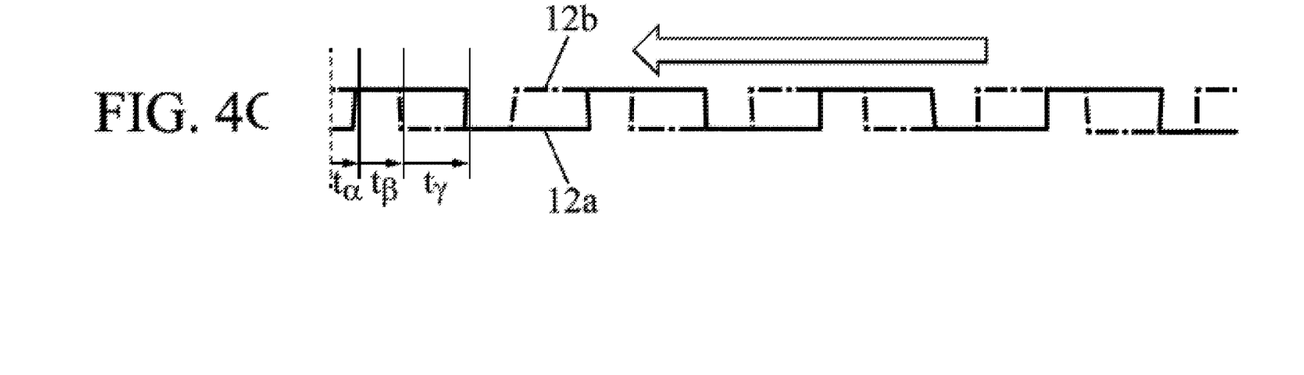

In operation, illustrated in FIGS. 4A to 4C, when the two sections are moving relative to one another, the protuberances 10 move facing the sensors 9. Let us consider an initial position illustrated in FIG. A, where a first sensor 9b is placed facing a protuberance 10 while the second sensor 9a is facing an opening. When the upper section 1 (and therefore the sensors 9) is moved relative to the lower section 4 (and thus the protuberances), the protuberances 10 travel past the sensors, and the signal detected by the two sensors 9 is different depending on whether the upper section 1 is sliding towards the front of the vehicle or towards the rear.

More particularly, in the case of the position of the sensors 9 which is described above, initially there is a difference between the signal of the first and of the second sensor 9 (over period to illustrated in FIG. 4B). Signal 12a represents the signal emitted by the front sensor 9a. Signal 12b represents the signal emitted by the rear sensor 9b. If the upper section 1 slides towards the front of the vehicle opposite the protuberances 10, once the rear sensor 9b has completely traveled over the facing protuberance, the rear sensor 9b is then facing an opening, and the difference between the signals of the two sensors 9 becomes zero (period $t_b$ in FIG. 4B). Then a difference reappears when the front sensor 9a travels over a protuberance while the rear sensor 9b is opposite an opening (period $t_c$ in FIG. 4B).

For this same initial position of the sensors, in the case where the upper section 1 is moving rearward, as shown in FIG. 4C, the two sensors 9 are both facing a protuberance within a shorter interval of time 43 than in the case described above.

As a result, depending on whether the upper section 1 is moving towards the front or towards the rear of the vehicle, different phase differences as obtained, as illustrated in FIGS. 4B and 4C.

The electronic control unit 8 comprises a processor programmed to determine the direction of movement of the rail, based on the signals from the two sensors. The information can then be transmitted to an embedded processor which can make use of the information. For example, one use is whether or not to trigger the airbags located at the front, depending on the detected direction of the sliding. Another exemplary use is to inform the user of the adjustment position, allowing the user to recommend an adjustment position or to store an initial adjustment position. If necessary, the electronic control unit is arranged in the rail, or in a central computer of the vehicle.

The sensor is for example a Hall effect sensor adapted to detect the presence or absence of protuberances 10 facing the sensor.

Figure 5:
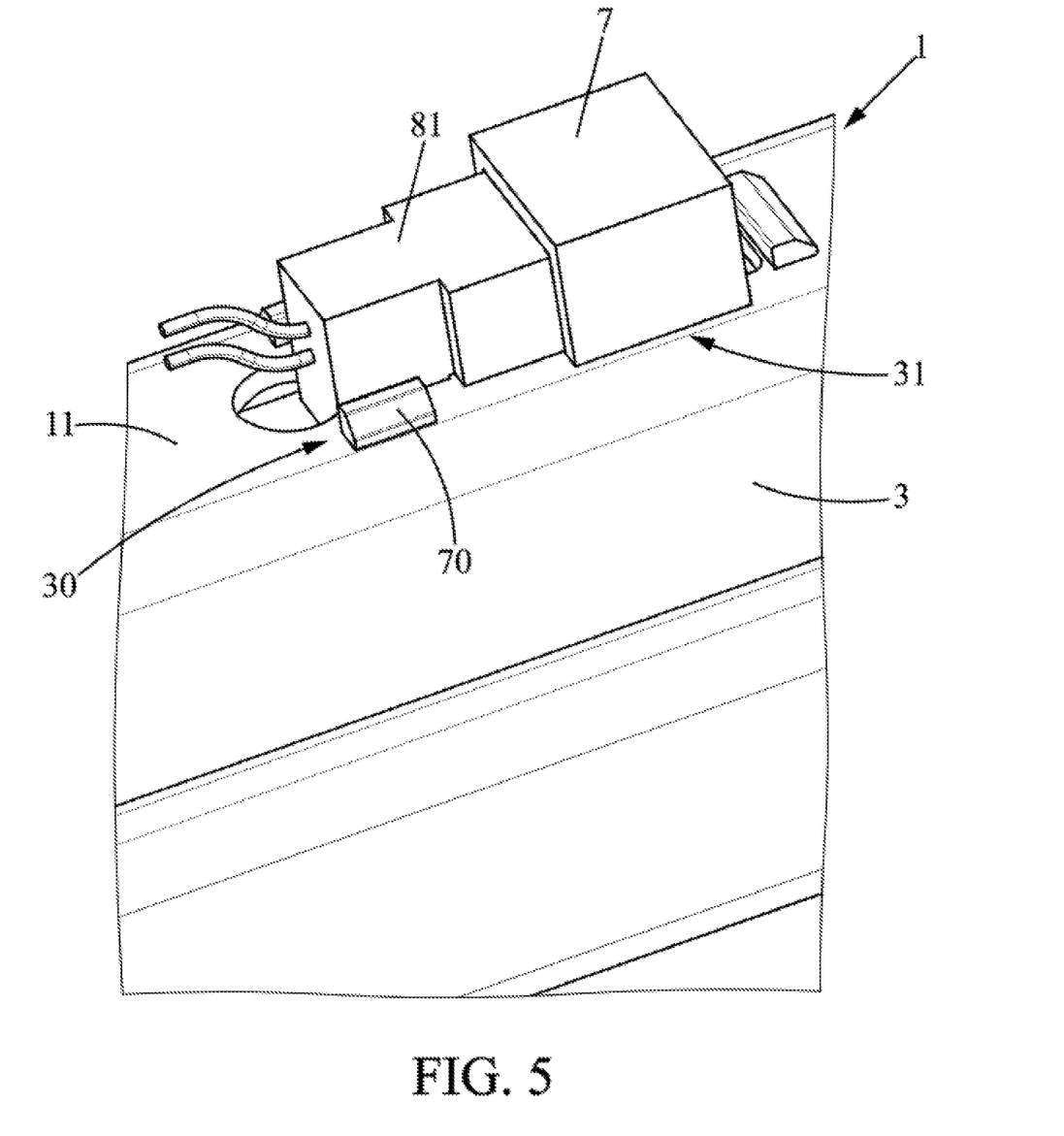
FIG. 5 is a perspective detail view of the top of the rail.

The sensors 9 are advantageously mounted on a housing 7, which is itself mounted on the upper section 1, as illustrated in FIG. 5.

Figure 6A:
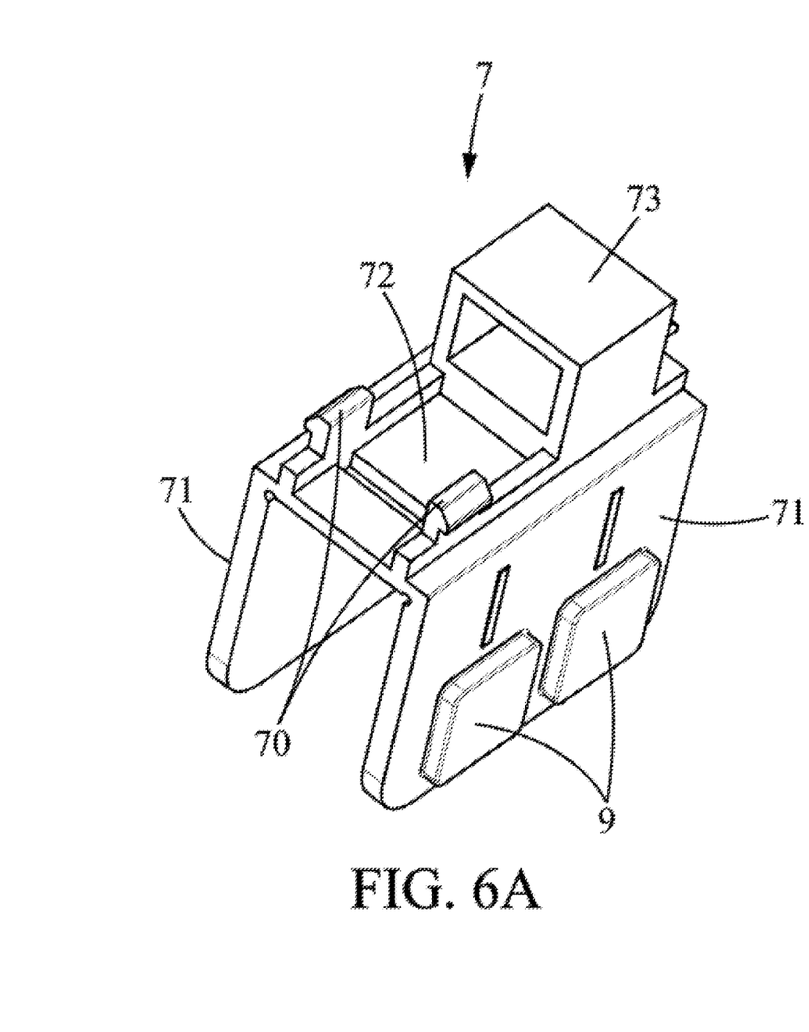
FIG. 6A is a perspective view of the housing 7.

The housing 7, of which the first embodiment is illustrated in FIG. 6A, has for example a U-shaped cross-section, with a portion 72 for attachment to the upper section, from which two lateral walls 71 extend. The portion 72 for attachment to the upper section is a central portion which is typically horizontal when the housing is mounted on the upper section 1, and which has for example mounting tabs 70 suitable for insertion into openings 30 provided in the web 11 of the upper section.

Figure 7:
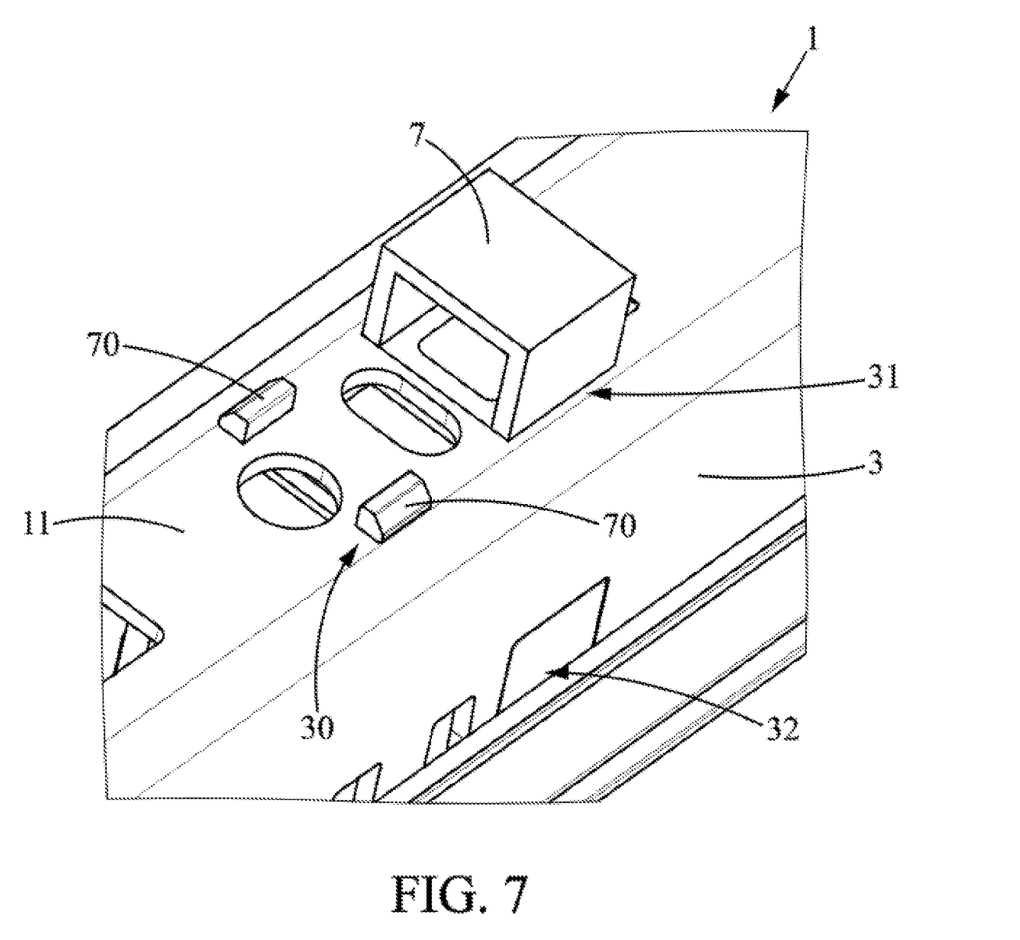
FIG. 7 is a view similar to FIG. 5 but without the connector.

The housing 7 also advantageously has a receiving portion 73 for receiving a connector 81 connected to the control electronic unit 8. The web of the upper section 11 has for example an opening 31 suitable for receiving the receiving portion 73 which is for example inserted through said opening 31 from below, and protrudes upwards from the web of the upper section 1 through the opening 31, as illustrated in FIG. 7.

In one particular embodiment, the connector 81, when mounted in the receiving portion 73, also serves to hold the tabs 70 in the openings 30 as illustrated in FIG. 5. In effect, the tabs 70 inserted in the openings 30 are held in the inserted position by the force exerted by the connector 81 which keeps them vertical, preventing their removal.

The two sensors 9 are for example side by side, spaced apart in the longitudinal direction, on a side wall of the housing, as shown in FIG. 6A. In this configuration, the upper section comprises, for example, two openings 32 in the corresponding lateral flange 2, so that when the housing is mounted in the upper section 1, the two sensors 9 are facing the protuberances 10 of the lower section through the two openings 32 of the lateral flange 2 of the upper section 1.

Figure 6B:
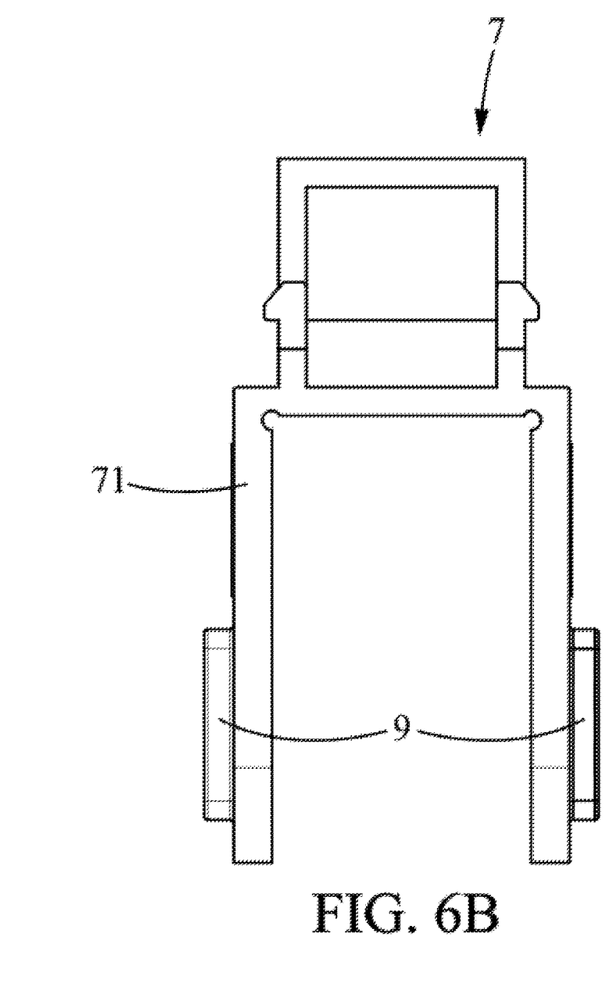
FIG. 6B is a front view of a housing according to another embodiment.

In a second embodiment, as shown in FIG. 6B, the lower section 4 may comprise two pluralities of protuberances, one on each of the opposing flanges 5, 6 of the lower section 4, and the upper section may comprise sensors 9 placed at the level of the two lateral flanges 2, 3 of the upper section 1, each respectively facing one of the two pluralities of protuberances.

The pluralities of protuberances may be offset so that there is a difference between the longitudinal position of a given protuberance of one of the pluralities of protuberances and the longitudinal position of a protuberance of the other plurality of protuberances, located opposite said given protuberance.

In this case, the two sensors 9 are offset by an inter-sensor distance which will be different both from an offset between the patterns of the pluralities of protuberances and from a sum of said offset and an integer multiple of the length of a pattern.

In this embodiment, the two sensors 9 may advantageously be mounted on opposing walls of the housing 7 described above, as shown in FIG. 6B. The two sensors 9 are therefore mounted in positions that are longitudinally different positions on each of the two walls of the housing 7.

In a variant of this embodiment, the two pluralities of protuberances may be aligned so that each protuberance of the plurality on one of the lateral flanges 5 of the lower section 4 will be aligned with a protuberance of the facing plurality on the other lateral flange 6. The inter-sensor distance is different both from the length of a pattern and from an integer multiple of the length of a pattern. The same evolution of the phase difference over time is thus obtained as in the first embodiment described.

In a variant of this embodiment, the two pluralities of protuberances are offset by a non-zero longitudinal offset between them that is different from the length of a pattern, and the sensors are aligned in the longitudinal direction.

In a third embodiment, not illustrated, the sensors 9 may have identical longitudinal positions, meaning that the inter-sensor distance will be zero. In this embodiment, to enable measuring a signal discriminating between the forward and backward movement of the upper section with respect to the lower section 4, the pluralities of protuberances have a non-zero longitudinal offset between them which is different from the length of a pattern and from an integer multiple of the length of a pattern.

To determine the direction of movement, the phase difference between the two signals is not 180°. For example, it may be a few degrees while being strictly positive so that the direction of movement is detected with certainty. With a small phase difference, this reduces the time to determine the direction of movement of the rail, after a first sensor detects the slot.

The system described above is particularly well-suited for a rail, which travels a long path and has room for installing the system. The first and second components are then respectively a first and a second section. The first degree of freedom is a direction of translation. Although the system has been presented above with reference to a rail, it could also be used in other adjustment mechanisms for a motor vehicle seat (for example a hinge for a motor vehicle seat suitable for adjusting the relative orientation of two elements of a motor vehicle seat about a transverse axis Y, comprising a fixed flange and a movable flange that can be rotated relative to the fixed flange).

The invention claimed is:

1. Adjustment mechanism for motor vehicle seat, comprising a first component able to move relative to a second component along a first degree of freedom, and comprising:
   at least a first and a second sensor which are mounted on the first component,
   at least one plurality of protuberances provided on the second component, said protuberances being spaced apart from one another along the first degree of freedom,
   said first sensor being mounted facing at least one plurality of protuberances so as to be able to detect the presence or absence of a protuberance facing said first sensor during a relative movement of the first and second components along the first degree of freedom,
   said second sensor being mounted facing at least one plurality of protuberances so as to be able to detect the presence or absence of a protuberance facing the second sensor during a relative movement of the first and second components along the first degree of freedom,
   the sensors being positioned so that there is a phase difference between the signals detected by the two sensors,
   the adjustment mechanism further comprising an electronic control unit able to determine a direction of movement of the components in relation to one another, from said detected phase difference, wherein:
   said first and second sensors are facing the same plurality of protuberances,
   an inter-sensor distance, corresponding to a distance between said first and second sensors along the longitudinal direction, being different both from a length of a pattern or patterns, and from an integer multiple of said length of the pattern or patterns,
   the length of said pattern or of each of said patterns corresponding to a sum of a length of a protuberance and a length of a space between said protuberance and an adjacent protuberance of said plurality of protuberances along the first degree of freedom.

2. Adjustment mechanism for motor vehicle seat according to claim 1, wherein:
   said protuberances are regularly spaced apart from one another along the second component.

3. Adjustment mechanism for motor vehicle seat, comprising a first component able to move relative to a second component along a first degree of freedom, and comprising:
   at least a first and a second sensor which are mounted on the first component,
   at least one plurality of protuberances provided on the second component, said protuberances being spaced apart from one another along the first degree of freedom,
   said first sensor being mounted facing at least one plurality of protuberances so as to be able to detect the presence or absence of a protuberance facing said first sensor during a relative movement of the first and second components along the first degree of freedom,
   said second sensor being mounted facing at least one plurality of protuberances so as to be able to detect the presence or absence of a protuberance facing the second sensor during a relative movement of the first and second components along the first degree of freedom,
   the sensors being positioned so that there is a phase difference between the signals detected by the two sensors,
   the adjustment mechanism further comprising an electronic control unit able to determine a direction of movement of the components in relation to one another, from said detected phase difference, wherein:
   said first and second sensors are each respectively facing a plurality of protuberances,
   an inter-sensor distance, corresponding to a distance between said first and second sensors, is different both from an offset between the patterns of the pluralities of protuberances, and from a sum of said offset and an integer multiple of said length of a pattern or patterns,
   the offset corresponding to a difference between a position of a given protuberance of one of the pluralities of protuberances, and the position of a protuberance of the other plurality of protuberances, located opposite said given protuberance,
   the length of said pattern or of each of said patterns corresponding to a sum of a length of a protuberance and a length of a space between said protuberance and an adjacent protuberance of said plurality of protuberances along the first degree of freedom.

4. Adjustment mechanism for motor vehicle seat, comprising a first component able to move relative to a second component along a first degree of freedom, and comprising:
   at least a first and a second sensor which are mounted on the first component,
   at least one plurality of protuberances provided on the second component, said protuberances being spaced apart from one another along the first degree of freedom, said first sensor being mounted facing at least one plurality of protuberances so as to be able to detect the presence or absence of a protuberance facing said first sensor during a relative movement of the first and second components along the first degree of freedom, said second sensor being mounted facing at least one plurality of protuberances so as to be able to detect the presence or absence of a protuberance facing the second sensor during a relative movement of the first and second components along the first degree of freedom, the sensors being positioned so that there is a phase difference between the signals detected by the two sensors, the adjustment mechanism further comprising an electronic control unit able to determine a direction of movement of the components in relation to one another, from said detected phase difference, wherein:

said first and second sensors are respectively facing a plurality of protuberances regularly spaced apart from one another, with a same spacing between said two pluralities of protuberances, an inter-sensor distance, corresponding to a distance between said two sensors, is zero, and said two pluralities of protuberances have a non-zero offset between them which is different from the length of a pattern, the offset corresponding to a difference between a position of a given protuberance of one of the pluralities of protuberances and the position of a protuberance of the other plurality of protuberances, located opposite said given protuberance, the length of a pattern corresponding to the sum of the length of a protuberance and the length of the space between said protuberance and an adjacent protuberance of said plurality of protuberances.

5. Adjustment mechanism for motor vehicle seat according to claim 1, wherein:

said protuberances are teeth, of which at least some are used to lock the relative position of movement between said components.

6. Adjustment mechanism for motor vehicle seat according to claim 1, wherein the adjustment mechanism for motor vehicle seat comprises a rail, wherein:

a first section, on which said first and second sensors are mounted, is the upper section of the rail, a second section, comprising said at least one plurality of protuberances, is the lower section of the rail, the first degree of freedom is a longitudinal direction of respective sliding of the first and second sections.

7. Adjustment mechanism for motor vehicle seat according to claim 1, wherein:

the first and second sensors are mounted along a lateral flange of the upper section, the at least one plurality of protuberances is arranged along a lateral flange of the lower section, the lateral flange of the upper section being placed facing the lateral flange of the lower section, so that the at least one plurality of protuberances is placed facing the first and second sensors.

8. Adjustment mechanism for motor vehicle seat according to claim 6, wherein:

the upper section comprises one or more openings in one and/or the other of its lateral flanges, said sensors are mounted integral with a housing, said housing being mounted on said upper section such that each sensor is facing one of said openings.

9. Adjustment mechanism for motor vehicle seat according to claim 8, wherein the housing is fixed to a horizontal upper web of the upper section.

10. Adjustment mechanism for motor vehicle seat according to claim 9, wherein the housing is held on the horizontal upper web of the upper section by tabs formed on the surface of the housing which clip into openings formed in said web.

11. Adjustment mechanism for motor vehicle seat according to claim 1, wherein each sensor is formed by a Hall effect sensor able to detect the presence or absence of teeth facing said sensor.

12. Vehicle seat comprising an adjustment mechanism for motor vehicle seat according to claim 1.

13. Adjustment mechanism for motor vehicle seat according to claim 3, wherein:

said protuberances are regularly spaced apart from one another along the second component.

14. Adjustment mechanism for motor vehicle seat according to claim 3, wherein:

said protuberances are teeth, of which at least some are used to lock the relative position of movement between said components.

15. Adjustment mechanism for motor vehicle seat according to claim 3, wherein the adjustment mechanism for motor vehicle seat comprises a rail, wherein:

a first section, on which said first and second sensors are mounted, is the upper section of the rail, a second section, comprising said at least one plurality of protuberances, is the lower section of the rail, the first degree of freedom is a longitudinal direction of respective sliding of the first and second sections.

16. Adjustment mechanism for motor vehicle seat according to claim 15, wherein:

the two sensors are mounted on two opposite lateral flanges of the upper section, each plurality of protuberances is arranged on an opposite lateral flange of the lower section, each lateral flange of the upper section being placed facing a lateral flange of the lower section, so that each plurality of protuberances of the lower section is facing a sensor of the upper section.

17. Adjustment mechanism for motor vehicle seat according to claim 15, wherein:

the upper section comprises one or more openings in one and/or the other of its lateral flanges, said sensors are mounted integral with a housing, said housing being mounted on said upper section such that each sensor is facing one of said openings.

18. Adjustment mechanism for motor vehicle seat according to claim 17, wherein the housing is fixed to a horizontal upper web of the upper section.

19. Adjustment mechanism for motor vehicle seat according to claim 18, wherein the housing is held on the horizontal upper web of the upper section by tabs formed on the surface of the housing which clip into openings formed in said web.

20. Adjustment mechanism for motor vehicle seat according to claim 3, wherein each sensor is formed by a Hall effect sensor able to detect the presence or absence of teeth facing said sensor.

21. Vehicle seat comprising an adjustment mechanism for motor vehicle seat according to claim 3.

22. Adjustment mechanism for motor vehicle seat according to claim 4, wherein:

said protuberances are teeth, of which at least some are used to lock the relative position of movement between said components.

23. Adjustment mechanism for motor vehicle seat according to claim 4, wherein the adjustment mechanism for motor vehicle seat comprises a rail, wherein:
- a first section, on which said first and second sensors are mounted, is the upper section of the rail,
- a second section, comprising said at least one plurality of protuberances, is the lower section of the rail,
- the first degree of freedom is a longitudinal direction of respective sliding of the first and second sections.

24. Adjustment mechanism for motor vehicle seat according to claim 4, wherein:
- the first and second sensors are mounted along a lateral flange of the upper section,
- the plurality of protuberances is arranged along a lateral flange of the lower section,
- the lateral flange of the upper section being placed facing the lateral flange of the lower section, so that the plurality of protuberances is placed facing the first and second sensors.

25. Adjustment mechanism for motor vehicle seat according to claim 23, wherein:
- the upper section comprises one or more openings in one and/or the other of its lateral flanges,
- said sensors are mounted integral with a housing, said housing being mounted on said upper section such that each sensor is facing one of said openings.

26. Adjustment mechanism for motor vehicle seat according to claim 25, wherein the housing is fixed to a horizontal upper web of the upper section.

27. Adjustment mechanism for motor vehicle seat according to claim 26, wherein the housing is held on the horizontal upper web of the upper section by tabs formed on the surface of the housing which clip into openings formed in said web.

28. Adjustment mechanism for motor vehicle seat according to claim 4, wherein each sensor is formed by a Hall effect sensor able to detect the presence or absence of teeth facing said sensor.

29. Vehicle seat comprising an adjustment mechanism for motor vehicle seat according to claim 4.

* * * * *